United States Patent [19]

Röskaft

[11] 3,910,649

[45] Oct. 7, 1975

[54] HYDRAULIC DEVICE FOR STRETCHING THE TRACKS OF A TRACKED VEHICLE

[75] Inventor: Björn Röskaft, Molde, Norway

[73] Assignee: Glamox A/S, Norway

[22] Filed: Apr. 25, 1974

[21] Appl. No.: 464,617

[30] Foreign Application Priority Data
Apr. 26, 1973 Norway.............................. 1727/73

[52] U.S. Cl................................ 305/10; 180/9.2 R
[51] Int. Cl.²......................................... B62D 55/00
[58] Field of Search......................... 305/10, 29, 31; 180/9,9.2 R

[56] References Cited
UNITED STATES PATENTS

| | | | |
|---|---|---|---|
| 2,561,901 | 7/1951 | Bachman.............................. | 305/10 |
| 2,818,311 | 12/1957 | Ashley................................... | 305/10 |
| 3,310,127 | 3/1967 | Siber.................................... | 305/10 X |
| 3,360,063 | 12/1967 | Hausenblas....................... | 305/10 X |

Primary Examiner—Philip Goodman
Attorney, Agent, or Firm—Wenderoth, Lind & Ponack

[57] ABSTRACT

A hydraulic device for stretching the tracks of tracked vehicles such as caterpillar tractors, crawlers and the like, with a closed circuit hydrostatic power transmission system, and in which the tracks are stretched by means of a hydraulic cylinder acting on the truck big idler. The stretching cylinder is communicating with that side of the closed hydrostatic transmission circuit which has high pressure when the vehicle is moving backward (rear mounted bull wheels) and feed pressure when the vehicle is moving forward. The stretching of the track(s) will then be proportional to the resistance against vehicle motion during backward driving preventing buckling of the ground engaging part of the track. Thus the track stretching is always in accordance with the requirements, excessive stretching is avoided and track wear substantially reduced.

18 Claims, 2 Drawing Figures

HYDRAULIC DEVICE FOR STRETCHING THE TRACKS OF A TRACKED VEHICLE

BACKGROUND OF THE INVENTION

This invention relates to a device for stretching the tracks of tracked vehicles such as caterpillar tractors, crawlers and the like, in which the drive system is based on a closed circuit hydrostatic power transmission.

The drive- or propulsion system of vehicles of this type ordinarily consists of a power supply, for example an internal combustion engine, and a hydraulic circuit comprising hydraulic pumps and motors with necessary tubing and valves, which directly or through a variable or fixed gear system transmits the motive power from the power supply to the bull wheels driving the endless tracks of the vehicles. Normally the bull wheels are arranged at the rear of the vehicle, one wheel on each side driving one track, respectively.

At the forward end of the vehicle each track passes over a front idler which normally is mounted on a track stretching device, the purpose of which is to keep the track properly stretched at any time, while at the same time being able to absorb shocks or relieve the tension on the track in case foreign matter builds up between track and wheels. Previously known track stretching devices usually include a biased resilient pressure means, e.g. a helical spring engaging the idler support. The helical spring in known stretching devices may be replaced by a hydraulic cylinder in connection with an accumulator, the piston rod of the cylinder being connected to the idler support.

Correct stretching of the track is of major importance in order to keep the wear of the components of the track system, such as the wheels, bearings, track elements etc., under control. Slack tracks as well as tracks which are too light will cause excessive wear.

Thus it is essential that the track stretcher of a tracked vehicle works effectively and provides correct track stretching at any time. In conventional track stretching devices the progressive wear developing in the track system must be compensated by frequent readjusting of the stretching device in order to retain a fairly satisfying functioning of the latter. The readjusting is achieved by increasing the distance between the idler and the belt wheel, either by means of a turnable adjusting bolt which is threaded into the idler support, or by means of a hydraulic adjusting device mounted between the idler support and vehicle frame. The first-mentioned threaded adjusting device is usually very troublesome as it is hard to get at and difficult to turn, owing to rust, foreign matter and the like. Hydraulic adjusting devices are very easy to use, but they have a major drawback in that even a very small leakage in the hydraulic system is likely to put the vehicle out of action.

Another important drawback of conventional track stretching devices lies in the fact that when the vehicle is moving backwards, that is when the lower part of the driving track is moving in direction from the drive wheel towards the stretching wheel, and the resistance against the movement increases, the spring means will be compressed and the axle base between the idler and bull wheel will decrease. The track will then be slackened and compressed in the lower portion engaging the ground with the result that the track may be kinked or bent at one or more damaging angles which the track rollers must climb over or press down. Of course this results in serious straining and wearing of the track. For that reason track vehicles should as far as possible be driven in a forward direction in order to avoid such condition, even if this frequently reduces the operations of which the vehicle is capable.

SUMMARY OF THE INVENTION

The object of this invention is to provide a hydraulic track stretching device for tracked vehicles of the introductorily mentioned type, in which the above drawbacks are eliminated. This is achieved by establishing a communication between the pressure in the hydraulic stretching cylinder and the pressure in the hydrostatic drive system of the vehicle, the stretching cylinder being connected to that side of the main hydraulic circuit having high pressure when the lower half of the track is driven in a direction from the bull wheel towards the idler, i.e. when the vehicle (bull wheels rear mounted) is driven backwards, and feed pressure when the track is driven in an opposite direction.

By such arrangement the axle base between the bull wheel and idler will remain substantially constant even when the vehicle is driven backwards, with the effect that the track is retained in a stretched condition and occurence of the previously mentioned damaging angles or bends in the track is prevented. Furthermore, when the stretching cylinder is correctly dimensioned, this arrangement enables the stretching device to provide the correct stretching effect at any time irrespective of the wear of the track system and without the necessity of manual readjusting of the stretching device. An additional advantage of the arrangement according to the invention is that minor leakages in the stretching cylinder or at any points in the hydraulic system will not influence the effectiveness of the stretching device. In order to avoid possible unfavourable fluctuations in the hydraulic system, pressure oscillation absorbing components may be connected between the stretching cylinder and the hydrostatic driving circuit.

Admittedly, the idea of connecting the hydraulic stretching cylinder to the hydrostatic drive system of a tracked vehicle is previously known from DOS 1,810,354. However, the hydrostatic drive system disclosed in that publication is an open circuit system and the stretching cylinder may consequently only communicate with the high pressure side of the system. Thus, none of the above favourable features of the stretching device according to the present invention are disclosed or suggested in the German publication. Furthermore, the stretching device shown in that publication has the disadvantage of being very sensitive to leakages in the pressure dependent stretching system.

BRIEF DESCRIPTION OF THE DRAWINGS

The invention will now be described in detail with reference to the accompanying drawings, in which.

DETAILED DESCRIPTION OF THE INVENTION

Figure 1:
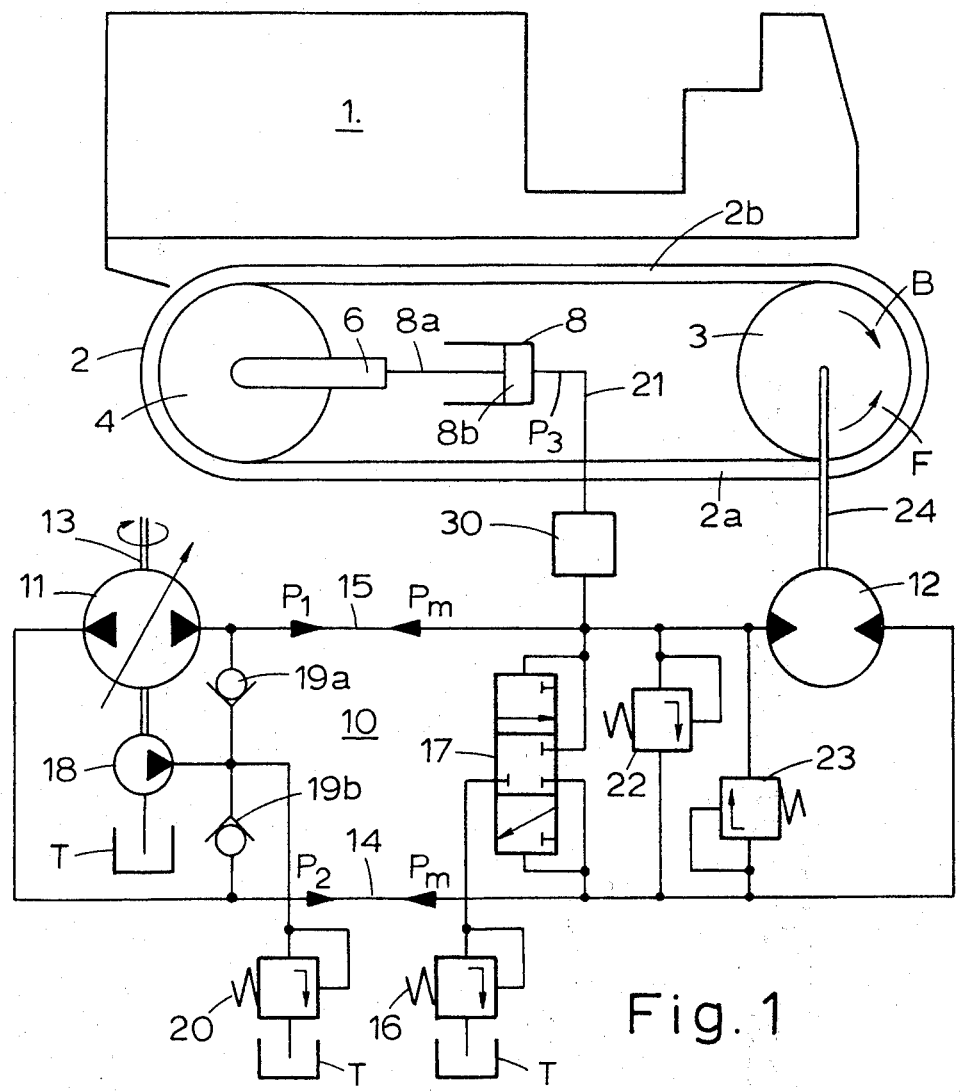
FIG. 1 is a diagrammatic elevational view of a tracked vehicle with a stretching device according to the invention and an accompanying connection diagram illustrating the hydraulic drive circuit.

Referring to FIG. 1 the number 1 denotes a tracked vehicle with at least one track 2 passing around a bull wheel or sprocket 3 which is located at the rear of the vehicle and over a large idler or stretching wheel 4 which is mounted near the front of the vehicle. The vehicle is also equipped with a number of track rollers not shown on the drawings.

The number 10 denotes generally the closed hydraulic circuit which transmits the motive power from a power supply (not shown) in the vehicle to the bull wheels. The hydraulic circuit 10 is conventional and does not constitute any part of the invention, but it is included in the description in order that the invention shall be clearly comprehensible. The hydraulic circuit appears from the connection diagram in FIG. 1 which will be easily understood by a person skilled in the art. Thus, only a short description of the circuit is given below.

The hydraulic circuit 10 includes at least one hydraulic pump 11 and a hydraulic motor 12 for each driving track 2. The pump 11 is driven by a power supply in the vehicle via a shaft 13 which always has the same rotational direction. The pump 11 may be operated to deliver fluid pressure alternatively through a conduit 14 or a conduit 15 to the hydraulic motor 12 which via an axle 24 drives the bull wheel 3 of the vehicle. The rotational direction of the motor 12 and consequently of the bull wheel 3 depends on whether the motor 12 is receiving the fluid pressure from the pump 11 through the conduit 14 or the conduit 15. When the fluid is pumped through the conduit 14, the drive axle 24 and bull wheel 3 will rotate in a counter-clockwise direction as indicated by the arrow F, and the lower track run or part 2a contacting the ground will perform a relative movement from the idler 4 towards the bull wheel 3, i.e. the vehicle will move forward (toward the left in the drawing). The pressure in the conduit 14 during forward movement of the vehicle is generally denoted by $P_2$ in the drawing. At the same time relieved return fluid will pass through the conduit 15 from the motor 12 back to the pump 11. If the pump 11 is reversed the pressure fluid will flow in the opposite direction, i.e. through the conduit 15, and the motor 12, the axle 24 and the bull wheel 3 will turn in the opposite direction as indicated by the arrow P. The lower track part 2a will now perform a relative movement from the bull wheel 3 towards the idler 4, and the vehicle 1 is driven backward (toward the right in the drawing). The return fluid from the motor is now flowing through the conduit 14 back to the pump 11. The pressure in the conduit 15 during rearward driving is generally denoted by $P_1$. Pressure limiting valves 22 and 23 prevent the driving pressures $P_2$ and $P_1$ in conduits 14 and 15, respectively, from exceeding a predetermined value.

The circuit 10 further includes a hydraulic pump 18 which also is driven by the power supply of the vehicle via the shaft 13, but which may have a lower capacity than the pump 11. The pump 18 delivers hydraulic fluid from the tank T in the system through non-return valves 19a and 19b, thus retaining the pressure in the return conduits 14 and 15 at a predetermined level, Pm. The level of the pressure Pm is set by means of an adjustable pressure limiting valve 16 which through a pressure-operated directional three port valve 17 alternatively maintains the feed pressure constant equal to Pm in the return conduits 14 and 15.

A pressure limiting valve 20 protects the pump 18 from pressure shock.

Returning now to the mechanical part of the propulsion system of the vehicle, the idler 4, as indicated in FIG. 1, may be supported in known manner in a yoke 6 which is connected to a piston rod 8a in a conventional hydraulic single acting cylinder 8 which is mounted on the vehicle frame.

According to the invention the cylinder 8 through a conduit or hose pipe 21 is connected to the conduit 15 between the pump 11 and the motor 12 in the hydraulic drive circuit 10. If desired, the conduit 21 may also include components adapted to absorb pressure oscillations and generally denoted by 30. Thus in the cylinder 8 there is built up a pressure $P_3$ which is in constant proportion to the pressure which at any time prevails in the conduit 15 between the pump 11 and the motor 12. The cylinder pressure $P_3$ acts on the piston 8b which via the piston rod 8a and the yoke 6 forces the idler 4 forwards against the track 2.

If now the pump 11 is operated in such a way that the motor 12 receives pressure fluid through the conduit 14, the bull wheel 3 and the track 2 as previously mentioned will drive the vehicle 1 in the forward direction, i.e. toward the left on FIG. 1. During forward driving the bull wheel 3 and the ground friction will act in opposite directions on the lower track half 2a, whereby the latter will maintain a favourably stretched condition along the ground without contribution from the idler 4, which during forward movement is acted upon by the lower feed pressure Pm and which generally serves to keep the upper track half 2b sufficiently stretched without unnecessarily straining the track components. Reversing the pump 11 such that pressure fluid flows through the conduit 15 to the motor 12 will result in backward movement of the vehicle, i.e. towards the right on the drawing, the lower track half now performing a relative motion in a direction away from the bull wheel and toward the idler, i.e. in the opposite direction of the vehicle movement. The bull wheel forces and the ground friction forces now acting on the lower track half 2a will tend to compress the lower track half, which in turn will tent to reduce the axle base between the bull wheel and the idler. Increased resistance against the vehicle motion will enhance this compressive tendency. Consequently, in conventional tracked vehicle constructions, as previously mentioned, the track frequently may be kinked or bent at damaging angles, thus seriously increasing the track wear. However, according to the present invention the pressure $P_3$ in the cylinder 8 and thus the stretching force on the idler 4 is in a constant proportion to the hydrostatic drive pressure $P_1$ when the lower part of the drive track 2 is driven relatively in a direction from the bull wheel toward the idler, or with other words, when the vehicle is moving backward. As the hydrostatic drive pressure $P_1$ increases proportionally to the resistance against the movement, the stretching of the track will increase by the same proportion, whereby the tendency of the track to kink or buckle is counteracted irrespective of the motion resistance. When the motion resistance is small the stretching of the track will be correspondingly low, so that the components of the track system are not exposed to unnecessary or excessive stretching which would result in increased wear. When a suitable diameter for the stretching cylinder is selected, a stretching force is obtained which provides sufficient stretching of the track during forward travel when the pressure on the cylinder piston is in proportion to the feed pressure Pm, as well as during backward travel when the cylinder pressure is in proportion to the drive pressure $P_1$.

As a result of the fact that during operation the pressure $P_3$ in the cylinder 8 never drops below a certain minimum pressure, manual readjusting of the idler 4 in order to compensate for wear on the track components will not be required. This feature constitutes a major advantage compared to conventional stretching devices. A minor leakage in the hydraulic system of the stretching device according to the invention will, contrary to what is the case when conventional stretching devices are concerned, not result in any immediate or serious weakening of the functioning of the stretching device, as the feed pump 18 always provides for refilling of lost fluid, such that the pressure $P_3$ in the cylinder 8 is maintained without regard to possible leakages.

Fluctuations or oscillations in the hydrostatic motive system may be a certain degree disturb the functioning of the track stretching device of the invention. In order to avoid such disturbances, as previously mentioned, various oscillation absorbing components 30 may be included in the conduit betwen the main circuit 10 and the cylinder 8.

Figure 2:
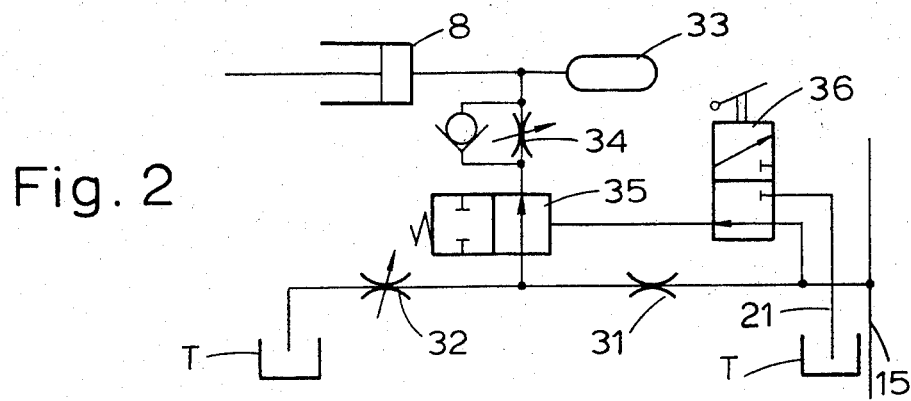
FIG. 2 is a connection diagram showing possible oscillation absorbing components which may be connected between the stretching cylinder according to the invention and the hydraulic drive circuit.

The connecting diagram of FIG. 2 illustrates a suitable arrangement of such components, i.e. these components constituting the part generally denoted by the number 30 in FIG. 1. The components may be used collectively or according to the requirements of a specific installation.

31 and 32 denote a fixed and an adjustable throttle valve or nozzle, respectively. By bleeding a small amount of fluid from the main circuit 10 through these valves to the tank T, the pressure $P_3$ in the stretching cylinder may be adjusted in a predetermined proportion to the pressure $P_1$ in the main conduit 15. The pressure proportion may be adjusted by means of the adjustable throttle valve 32. The oscillation absorbing components may for example consist of an accumulator 33 connected to the conduit 21, such that the cylinder pressure $P_3$ varies proportionally to the distance travelled by the cylinder piston. Further a throttle nonreturn valve 34 may be included, giving a pressure $P_3$ proportional to the speed of motion of the piston. A manually or automatically controlled two port valve 35 may also be included, which causes the pressure $P_3$ to maintain a minimum value corresponding to the feed pressure Pm when the pumps are stopped, ensuring that minimum track stretching is maintained also in this case. The two port valve 35 is manually controlled by means of the three port valve 36 which connects the control port of the two port valve 35 to the conduit 21 or tank T, respectively.

In accordance with normal practice when track vehicles are considered, in the preferred embodiment illustrated in FIG. 1, the bull wheel is located at the rear of the vehicle, while the idler is located in the front. If desired, this arrangement may of course be reversed, and the conditions described above for backward travelling will in that case apply when the vehicle is travelling forward, as the stretching cylinder then will be connected to that side of the hydrostatic drive circuit having high pressure forward travelling.

I claim:

1. A hydraulic track stretching system for use in a tracked vehicle of the type including at least one track system comprising a track passing around a bull wheel and an idler; and a closed circuit hydrostatic power transmission system operatively coupled to said bull wheel for alternatively driving said bull wheel in a first direction moving the lower run of said track from said idler to said bull wheel, driving said bull wheel in a second direction moving said lower track run from said bull wheel to said idler, or placing said bull wheel in a neutral position; said closed circuit hydrostatic power transmission system having a portion maintained at a higher drive pressure when said bull wheel is driven in said second direction and maintained at a lower feed pressure when said bull wheel is driven in said first direction or placed in said neutral position; said track stretching system comprising:

a hydraulic stretching cylinder having a piston therein, said piston having a rod connected to said idler, said piston and rod being movable in response to fluid pressure in said cylinder toward said idler and thereby comprising means for moving said idler away from said bull wheel; and means for hydraulically connecting said cylinder with said portion of said closed circuit hydrostatic power transmission system and for maintaining said cylinder pressure proportional to the pressure in said portion.

2. A system as claimed in claim 1, wherein said connecting means further includes means for regulating said cylinder pressure and for absorbing oscillations in said pressure in said portion.

3. A system as claimed in claim 2, wherein said regulating means comprises a fixed and an adjustable throttle valve.

4. A system as claimed in claim 2, wherein said oscillation absorbing means comprises an accumulator.

5. A system as claimed in claim 4, wherein said oscillation absorbing means further comprises a throttle nonreturn valve.

6. A system as claimed in claim 2, wherein said oscillation absorbing means comprises a throttle non-return valve.

7. A system as claimed in claim 2, wherein said regulating means comprises shut off means for maintaining a predetermined minimum pressure in said stretching cylinder when said pressure in said portion drops below said minimum pressure.

8. A system as claimed in claim 7, wherein said shut off means comprises a two port valve operable in response to said pressure in said portion.

9. A system as claimed in claim 8, wherein said two port valve includes means for allowing manual operation thereof.

10. In a tracked vehicle of the type including at least one track system comprising a track passing around a bull wheel and an idler; a closed circuit hydrostatic power transmission system operatively coupled to said bull wheel for alternatively driving said bull wheel in a first direction moving the lower run of said track from said idler to said bull wheel, driving said bull wheel in a second direction moving said lower track run from said bull wheel to said idler, or placing said bull wheel in a neutral posistion; said closed circuit hydrostatic power transmission system having a portion maintained at a higher drive pressure when said bull wheel is driven in said second direction and maintained at a lower feed pressure when said bull wheel is driven in said first direction or placed in said neutral position; and a track stretching system including a hydraulic stretching cylinder having a piston therein, said piston having a rod connected to said idler, said piston and rod being movable in response to fluid pressure in said cylinder toward said idler and thereby comprising means for moving said idler away from said bull wheel; the improvement comprising:

means for hydraulically connecting said cylinder with said portion of said closed circuit hydrostatic power transmission system and for maintaining said cylinder pressue proportional to the pressure in said portion.

11. The improvement claimed in claim 10, wherein said connecting means further includes means for regulating said cylinder pressure and for absorbing oscillations in said pressure in said portion.

12. The improvement claimed in claim 11, wherein said regulating means comprises a fixed and an adjustable throttle valve.

13. The improvement claimed in claim 11, wherein said oscillation absorbing means comprises an accumulator.

14. The improvement claimed in claim 13, wherein said oscillation absorbing means further comprises a throttle non-return valve.

15. The improvement claimed in claim 11, wherein said oscillation absorbing means comprises a throttle non-return valve.

16. The improvement claimed in claim 11, wherein said regulating means comprises shut off means for maintaining a predetermined minimum pressure in said stretching cylinder when said pressure in said portion drops below said minimum pressure.

17. The improvement claimed in claim 16, wherein said shut off means comprises a two port valve operable in response to said pressure in said portion.

18. The improvement claimed in claim 17, wherein said two port valve includes means for allowing manual operation thereof.

* * * * *